United States Patent
Crocker et al.

(10) Patent No.: US 11,587,292 B2
(45) Date of Patent: Feb. 21, 2023

(54) TRIGGERED VIRTUAL REALITY AND AUGMENTED REALITY EVENTS IN VIDEO STREAMS

(71) Applicant: DISNEY ENTERPRISES, INC., Burbank, CA (US)

(72) Inventors: John Holbrook Crocker, Valencia, CA (US); Wilfredo Rosas, Encino, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/049,742

(22) Filed: Jul. 30, 2018

(65) Prior Publication Data

US 2020/0035025 A1 Jan. 30, 2020

(51) Int. Cl.
*G06T 19/00* (2011.01)

(52) U.S. Cl.
CPC ........ *G06T 19/006* (2013.01); *G06T 2200/04* (2013.01)

(58) Field of Classification Search
CPC .. G06T 19/006; H04N 21/431; H04N 21/435; H04N 21/84; H04N 13/178; H04N 21/23; H04N 21/235; H04N 21/2353; H04N 21/8547; H04N 7/188; H04N 21/47205; G06F 16/78; G06F 16/783; G06F 16/7837; G06F 16/7867
See application file for complete search history.

(56) References Cited

U.S. PATENT DOCUMENTS

| | | | |
|---|---|---|---|
| 9,646,421 B2 | 5/2017 | Ayers et al. | |
| 2012/0131043 A1* | 5/2012 | Lee | G11B 27/034 |
| | | | 707/769 |
| 2014/0002442 A1* | 1/2014 | Lamb | G06F 3/1431 |
| | | | 345/419 |
| 2016/0163063 A1* | 6/2016 | Ashman | G06F 3/011 |
| | | | 345/633 |
| 2017/0061694 A1* | 3/2017 | Giraldi | G06T 19/006 |
| 2017/0277253 A1* | 9/2017 | Mullen | A63F 13/20 |
| 2017/0372485 A1* | 12/2017 | Tsunashima | G06K 9/00335 |
| 2018/0074332 A1* | 3/2018 | Li | G06F 1/163 |
| 2018/0115807 A1* | 4/2018 | Todorovic | H04N 7/148 |
| 2018/0288499 A1* | 10/2018 | Niemeyer | H04N 21/4126 |
| 2018/0367835 A1* | 12/2018 | Hamidi-Rad | H04N 21/4126 |
| 2019/0140885 A1* | 5/2019 | Murrish | A63F 13/847 |
| 2019/0156545 A1* | 5/2019 | Horn | G06F 3/04845 |

* cited by examiner

*Primary Examiner* — Jennifer Mehmood
*Assistant Examiner* — Andrew Shin
(74) *Attorney, Agent, or Firm* — Artegis Law Group, LLP

(57) ABSTRACT

Various embodiments of the invention disclosed herein provide techniques for generating a virtual object for a VR/AR environment in response to a trigger. A VR/AR application executing on a client device receives a media content item. The VR/AR application detects an event trigger associated with the media content item. The VR/AR application generates at least a portion of a virtual object based on the event trigger. The VR/AR application displays the media content item and the at least a portion of the virtual object on a display associated with a user device.

21 Claims, 14 Drawing Sheets

TRIGGERED VIRTUAL REALITY AND AUGMENTED REALITY EVENTS IN VIDEO STREAMS

BACKGROUND OF THE INVENTION

Field of the Invention

The present invention relates generally to virtual reality and augmented reality systems and, more specifically, to triggered augmented reality and virtual reality events in video streams.

Description of the Related Art

Virtual reality (VR) and augmented reality (AR) are rapidly growing forms of media entertainment. In a VR system, a user experiences an artificial three-dimensional (3D) environment generated by a computer, where the user views the VR environment via a VR display apparatus, such as VR glasses or a VR headset. Similarly, in an AR system, a user experiences two-dimensional (2D) and/or three-dimensional (3D) objects generated by a computer along with actual objects in the physical world, where the user views the AR environment via a display apparatus, such as AR glasses or an AR headset. A typical AR display apparatus is fitted with a camera to capture images of the physical environment surrounding the user. The captured images are superimposed with one or more virtual, computer-generated 2D and/or 3D objects and then displayed on the display apparatus.

In some VR and AR applications, a user can view two-dimensional (2D) media content, such as movies, television programs, or other video sources, while experiencing a virtual 3D or physical environment, as the case may be. In these types of VR applications, a VR system typically generates a fixed 3D environment, such as a living room, and then projects the 2D media content onto a virtual display screen that is present in the fixed 3D environment. In these types of AR applications, an AR system typically displays the 2D media content on a virtual display screen that is projected onto the physical environment of the user. The user then views the 2D media content on the virtual display screen within the physical environment.

One drawback to the above approaches is that the interaction between the user and the VR/AR environment is typically quite minimal. Consequently, the user experience is oftentimes static, passive, and essentially the same as watching a movie or television program in one's own living room. As a result, the user does not enjoy the rich, immersive 3D experience that VR/AR systems are capable of generating and providing.

As the foregoing illustrates, what is needed in the art are more effective techniques for generating immersive environments when viewing 2D media content via a VR or AR system.

SUMMARY OF THE INVENTION

Various embodiments of the present application set forth a method for Various embodiments of the invention disclosed herein provide techniques for generating a virtual object for a VR/AR environment in response to a trigger. A VR/AR application executing on a client device. The method includes receiving a media content item. The method further includes detecting an event trigger associated with the media content item. The method further includes generating at least a portion of a virtual object based on the event trigger. The method further includes displaying the media content item and the at least a portion of the virtual object on a display associated with a user device.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that 2D media content, when viewed via a VR/AR headset, is more interactive relative to prior approaches. More particularly, by triggering the generation of appropriate 2D and 3D objects in the VR/AR environment and providing mechanisms to interact with these 2D and 3D objects, the user's experience is more immersive and unique relative to prior approaches. In this manner, a variety of effects may be generated by synchronizing 2D video triggers with 2D and 3D objects. Further, triggers may be embedded within the generated 2D and 3D objects. Consequently, an event trigger in a 2D video sequence may produce a 3D object in the VR/AR environment, and the 3D object may consequently trigger an event in the 2D media content. As a result, the user has the experience of being inside the 2D media content rather than just viewing the content from an "outsider's" perspective. These advantages represent one or more technological improvements over the prior art.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
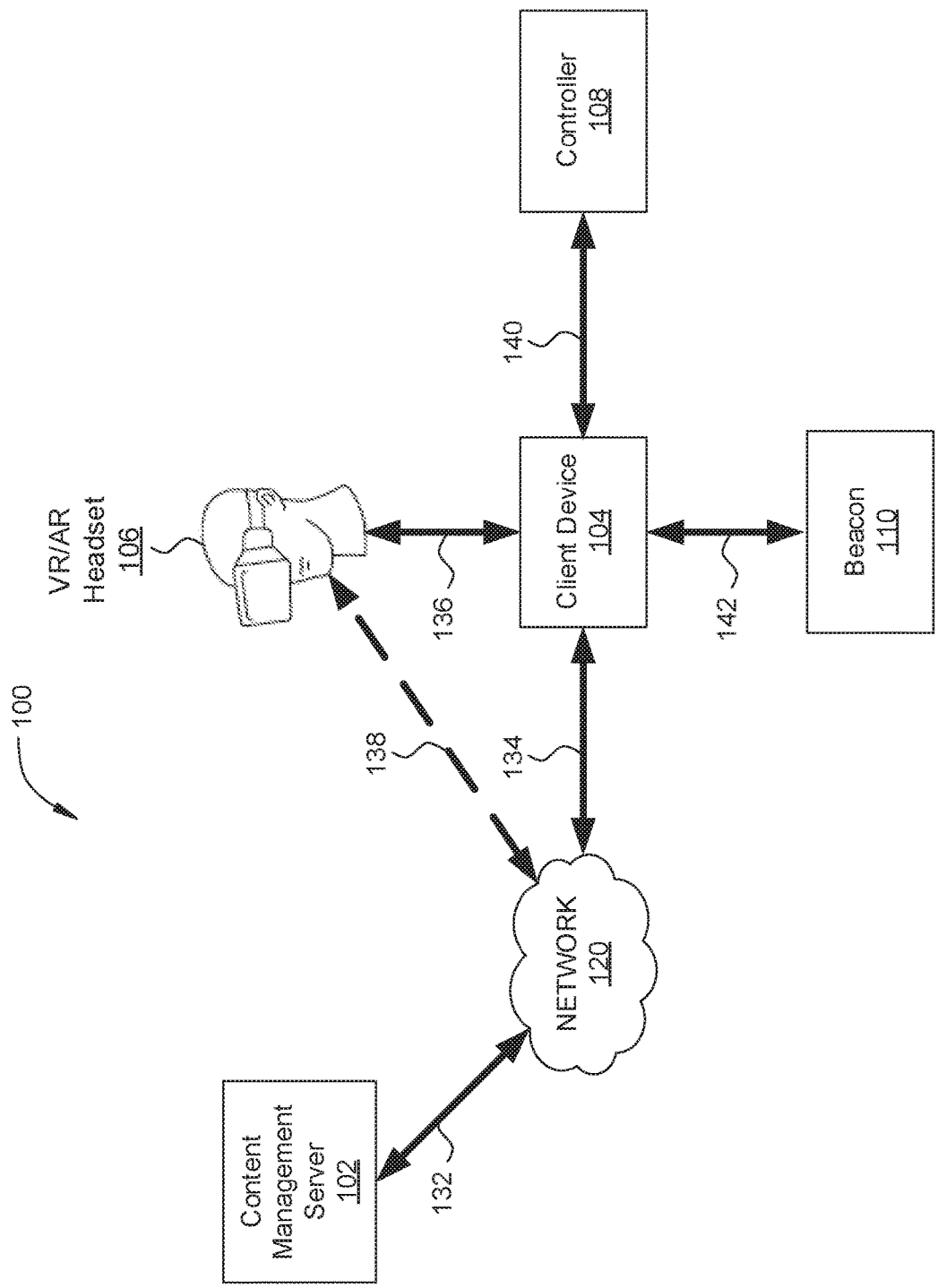
FIG. 1 illustrates a system configured to implement one or more aspects of the present invention.

FIG. 1 illustrates a system 100 configured to implement one or more aspects of the present invention. As shown, the system includes, without limitation, a content management server 102, a client device 104, a VR/AR headset 106, a controller 108, and a beacon 110. Content management server 102, client device 104, and VR/AR headset 106 are in communication with each other via a network 120. Network 120 may be any suitable environment to enable communications among remote or local computer systems and computing devices, including, without limitation, point-to-point communications channels, wireless and wired LANs (Local Area Networks), and one or more internet-based WANs (Wide Area Networks).

The content management server 102, also referred to herein as a content management system (CMS), includes, without limitation, a computing device that may be a stand-alone server, a cluster or "farm" of servers, one or more network appliances, or any other device suitable for implementing one or more aspects of the present invention. Illustratively, content management server 102 communicates over network 120 via communications link 132. Content management server 102 stores various items of 2D media content, such as movies, television programs, or other video content. In some embodiments, content management server 102 embeds triggers in the form of metadata within the 2D media content. When client device 104 requests a 2D media content item, content management server 102 retrieves and transmits the 2D content metadata to client device 104.

Client device 104 includes, without limitation, a computing device that may be a personal computer, video game console, personal digital assistant, mobile phone, mobile device, or any other device suitable for implementing one or more aspects of the present invention. Illustratively, client device 104 communicates over network 120 via communications link 134. Further, client device 104 communicates with VR/AR headset 106, controller 108, and beacon 110 over communications links 136, 140, and 142, respectively. Each of communications links 136, 140, and 142 may be any technically feasible wired or wireless communications channel in any combination, including, without limitation, Bluetooth, WiFi, and infrared communications.

As further described herein, client device 104 receives user requests to view 2D media content items, such as movies, television programs, or other video content. Upon receiving a user request to view a 2D media content item, client device 104 transmits the request to content media server 102. In response, content media server 102 transmits the 2D media content to client device 104. In addition or alternatively, client device 104 retrieves the 2D media content item from local memory or storage. Client device 104 generates a virtual screen within the 3D virtual or augmented environment and displays the 2D media content on the virtual screen. Client device 104 further detects event triggers, as further described herein. In response to detecting an event trigger, client device generates one or more 3D objects and/or 2D objects. Client device 104 translates various 2D and 3D visual elements into the native format of VR/AR headset 106. These 2D and 3D visual elements include, without limitation, the 3D virtual or augmented environment, virtual screen, 2D media content, and other 2D and 3D objects. Client device 104 transmits the translated 2D and 3D visual elements to VR/AR headset 106 for display.

VR/AR headset 106 includes, without limitation, a computing device that may be a personal computer, video game console, personal digital assistant, mobile phone, mobile device, or any other device suitable for implementing one or more aspects of the present invention. Illustratively, VR/AR headset 106 communicates with client device 104 over any technically feasible wired or wireless communications protocol via communications link 136. In some embodiments, VR/AR headset 106 includes an active device, such as personal digital assistant, a mobile phone, or a mobile device mounted in a passive headset. In some embodiments, VR/AR headset 106 is an active headset that includes an embedded processor executing software. VR/AR headset 106 receives translated 2D and 3D visual elements from client device 104. VR/AR headset 106 displays the received 2D and 3D visual elements on a display screen associated with VR/AR headset 106.

In some embodiments, when a user wears VR/AR headset 106, the user may see one or more computer-generated 2D and 3D objects overlaid on a background that represents an environment. The environment may be computer-generated or an image of the user's physical environment as captured by a camera mounted on VR/AR headset 106. In some embodiments, the user may see through the display of the VR/AR headset 106 to view the user's physical environment. In these embodiments, the user views one or more computer-generated 2D and 3D objects that appear to be overlaid over the physical environment.

In some embodiments, VR/AR headset 106 may communicate over network 120 via communications link 138. Communications link 138 may be any technically feasible communication channel, including, without limitation, point-to-point communications channels, one or more LANs, and one or more internet-based WANs. Via communications link 138, VR/AR headset 106 may perform any one or more functions described in conjunction with client device 104, as further described herein.

Controller 108 is a device that includes one or more controls that may be activated by a user. Such controls include, without limitation, buttons, a joystick, a "weapon" that may be aimed and fired, and steering mechanism. Illustratively, controller 108 communicates with client device 104 over any technically feasible wired or wireless communications protocol via communications link 140. Controller 108 detects when one or more controls are activated, such as when a button is pushed, a joystick is moved, or a weapon is aimed and fired. Controller 108 converts the detected activations into electronic data and transmits the electronic data to client device 104 over communications channel 140.

Beacon 110 is a device that provides an anchor point to a particular point within the user's physical environment. Illustratively, beacon 110 communicates with client device 104 over any technically feasible wired or wireless communications protocol via communications link 142. Beacon transmits location information to client device 104. Via this location information, client device 104 tracks and anchors computer-generated virtual objects relative to the location of beacon 110. For example, beacon could transmit location information that effectively anchors beacon 110 to a point on the floor in the room. As a result, the user could walk around the room to see the virtual objects from any position and angle. The virtual objects would remain anchored relative to the location of beacon 110, regardless of the location of the user. Without such a beacon, the virtual objects would be anchored relative to VR/AR headset 106 rather than to a particular point in the room as established by beacon 110. As a result, the virtual objects would move with the user through space, and the user could not get close to or walk around the virtual objects. In some embodiments, client device 104 may employ any technically feasible location detection approach in addition to or alternatively to beacon 110.

It will be appreciated that the system shown herein is illustrative and that variations and modifications are possible. In one example, although the system 100 of FIG. 1 is illustrated with one content management server 102, one client device 104, one VR/AR headset 106, one controller 108, and one beacon 110, the system 100 could include any technically feasible number of content management servers 102, client devices 104, VR headsets 106, controllers 108, and beacons 110 within the scope of the present disclosure. In another example, the 2D media content described herein may be stored on any one or more devices in any combination, including, without limitation, on content management server 102, client device 104, VR/AR headset 106, or on any other technically feasible device that communications over network 120.

Several techniques for generating and displaying 2D and 3D virtual objects in conjunction with 2D media content are now described in further detail.

Generating Virtual Objects Based on Trigger Detection

Figure 2:
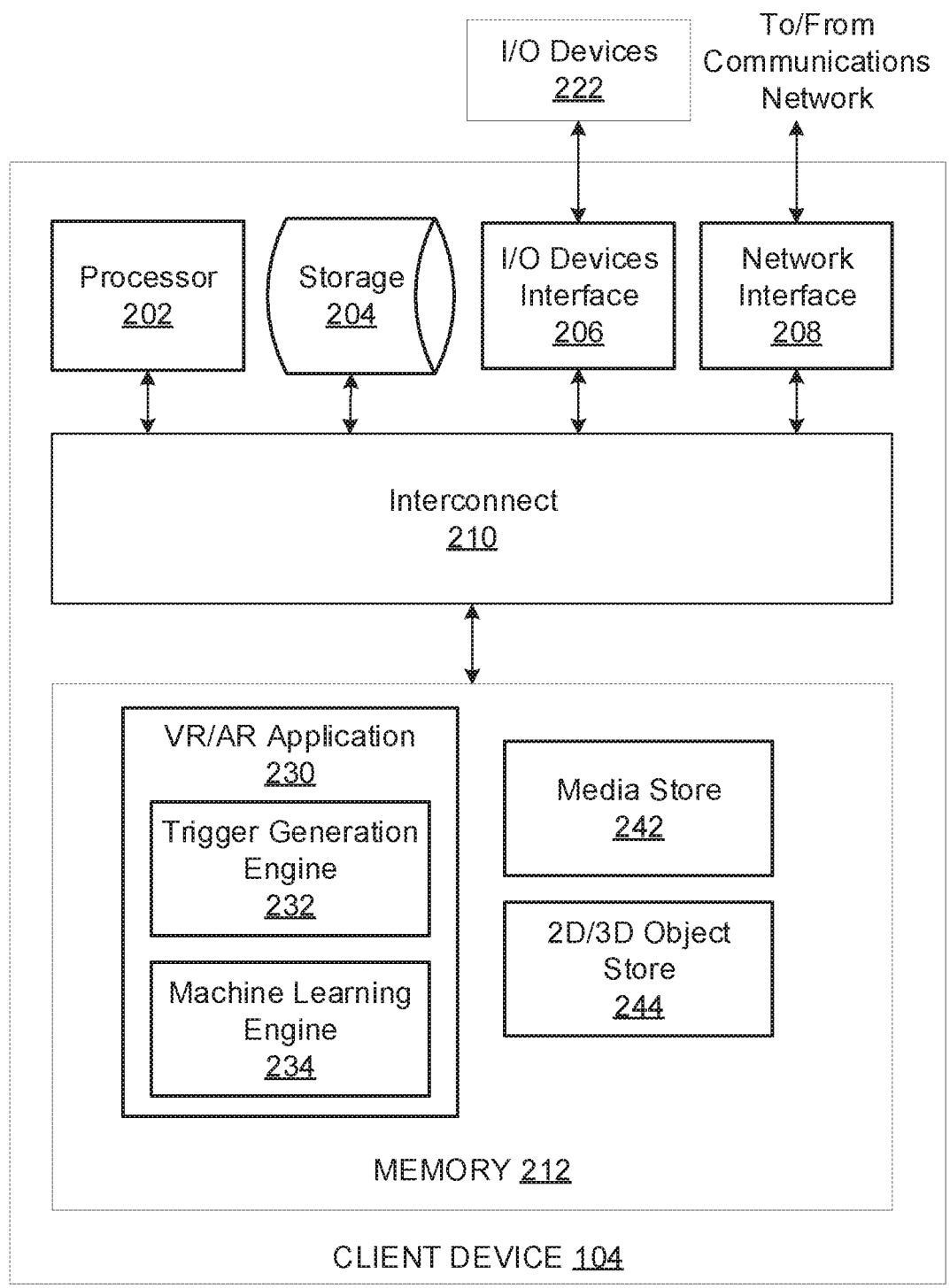
FIG. 2 is a more detailed illustration of the client device of FIG. 1, according to various embodiments of the present invention.

FIG. 2 is a more detailed illustration of the client device 104 of FIG. 1, according to various embodiments of the present invention. As shown in client device 104 includes, without limitation, a central processing unit (CPU) 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a VR/AR application 230 that further includes a trigger generation engine 232 and a machine learning (ML) engine 234. The system memory 212 includes, without limitation, a media store 242 and a 2D/3D object store 244. The VR/AR application 230, trigger generation engine 232, and machine learning ML engine 234, when executed by the processor 202, performs one or more operations associated with client device 104 of FIG. 1, as further described herein. Media store 242 provides memory storage for various items of 2D media content, as further described herein. 2D/3D object store 2444 provides memory storage for various 2D and 3D objects for displaying in a virtual or augmented environment, as further described herein.

In operation, trigger generation engine 232 detects event triggers, also referred to herein as triggers, via various techniques and generates corresponding 2D and 3D virtual objects in response to detecting such triggers. Trigger generation engine 232 detects the triggers by analyzing metadata embedded into the 2D media content being displayed, by analyzing watermarks embedded into one or more video frames of the 2D media content, or by receiving triggers from ML engine 234, in any combination.

In a first technique, triggers are embedded into metadata within the 2D media content itself. The trigger includes a unique identifier (UID) and a timestamp. The timestamp may be in any technically feasible format. The UID identifies which 3D objects and effects to instantiate. Via the UID, the trigger generation engine 232 determines the location of a description file of the object or effect, along with position, size, orientation, duration of existence, motion characteristics, and any other relevant information needed to generate and animate the 3D object or effect. When the playback of the 2D media content reaches the time indicated by the timestamp, trigger generation engine 232 generates the 3D object based on the characteristics identified by the UID.

In a second technique, the trigger is embedded into a watermark that is present in a video frame of the 2D media content. The watermark may or may not be perceivable to a viewer of the 2D media content. The watermark includes an encoding of the UID. The encoding of the watermark may be in the form of a barcode or any other technically feasible encoding format. The watermark may further include a timestamp that identifies the time of the trigger. The timestamp may be in any technically feasible format. In addition or alternatively, the time of the trigger may be the time of the video frame where the watermark appears. Trigger generation engine 232 detects the watermark via a camera mounted to VR/AR headset 106 when pointed at the virtual screen displaying the 2D media content. In addition or alternatively, trigger generation engine 232 detects the watermark via a virtual image-recognition rendering camera that is focused on the 2D media content displayed on the virtual screen. In addition or alternatively, trigger generation engine 232 detects the watermark via direct analysis of the 2D media content displayed on the virtual screen. At the appropriate time, trigger generation engine 232 generates the 3D object based on the characteristics identified by the UID.

In a third technique, trigger generation engine 232 receives the trigger from ML engine 234, as further described herein. Trigger generation engine 232 generates the virtual object based on the received trigger and associated characteristics of the virtual object as determined by the ML engine.

These three techniques may be employed either alone or in any technically feasible combination within the scope of the present disclosure.

In some embodiments, one or more of the generated 3D objects may include an embedded trigger. The embedded trigger includes a UID that defines an event that occurs when the corresponding 3D object interacts with the virtual screen. For example, a first trigger could be detected via any of the techniques described above. The first trigger could cause trigger generation engine 232 to generate a 3D object with a second embedded trigger. Trigger generation engine 232 generates the 3D object when a corresponding element in the 2D media content is about to leave the boundary of the virtual screen. The 3D object would then move through the VR/AR environment and could consequently approach the virtual screen. As the 3D object is about the reenter the boundary of the virtual screen, the second embedded trigger would cause trigger generation engine 232 to generate a corresponding 2D element within the 2D media content. In this manner, an event trigger in a 2D video sequence may produce a 3D object in the VR/AR environment, and the 3D object may consequently trigger an event in the 2D media content.

Upon generating the elements for display, including the virtual/augmented environment, virtual screen, 2D media content, and other 2D and 3D objects and effects, trigger generation engine 232 translates the elements into a format that is native to VR/AR headset 106. After translating the elements into the native format of VR/AR headset 106, trigger generation engine 232 transmits the translated elements to VR/AR headset 106. VR/AR headset 106 then displays the translated elements.

ML engine 234 analyzes the 2D media content to determine when a trigger takes place. The virtual or augmented environment includes a virtual image-recognition rendering camera that is focused on the 2D media content displayed on the virtual screen. ML engine 234 employs visual recognition and artificial intelligence (AI) techniques to detect predefined objects and the actions of those predefined objects to trigger the generation of a corresponding 3D virtual object. ML engine 234 predicts the time at which the 3D virtual object is to be instantiated.

For example, ML engine 234 could detect when a particular object in the 2D media content is about to leave the space bounded by the virtual screen. The ML engine would then generate a trigger at the appropriate time. The trigger would identify a model of the virtual object, along with position, size, orientation, and motion characteristics of the virtual object. ML engine 234 transmits the trigger and corresponding characteristics of the virtual object to trigger generation engine 232. In response, trigger generation engine 232 generates virtual object based on the characteristics determined by ML engine 234.

The operation of trigger generation engine 232 and ML engine 234 is now further described via several example use cases.

Figure 3A:
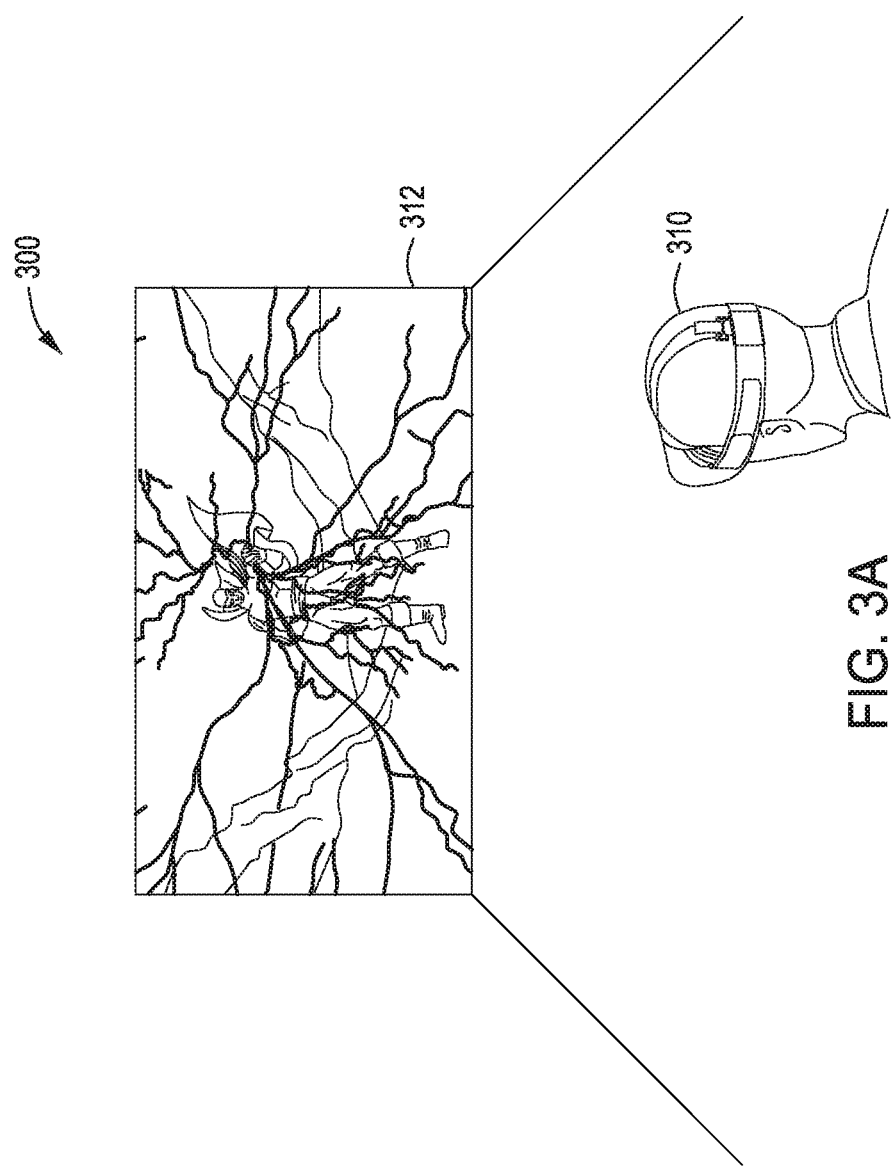
FIGS. 3A-3B illustrate examples of VR/AR environments generated by the system of FIG. 1, according to various embodiments of the present invention.
Figure 3B:
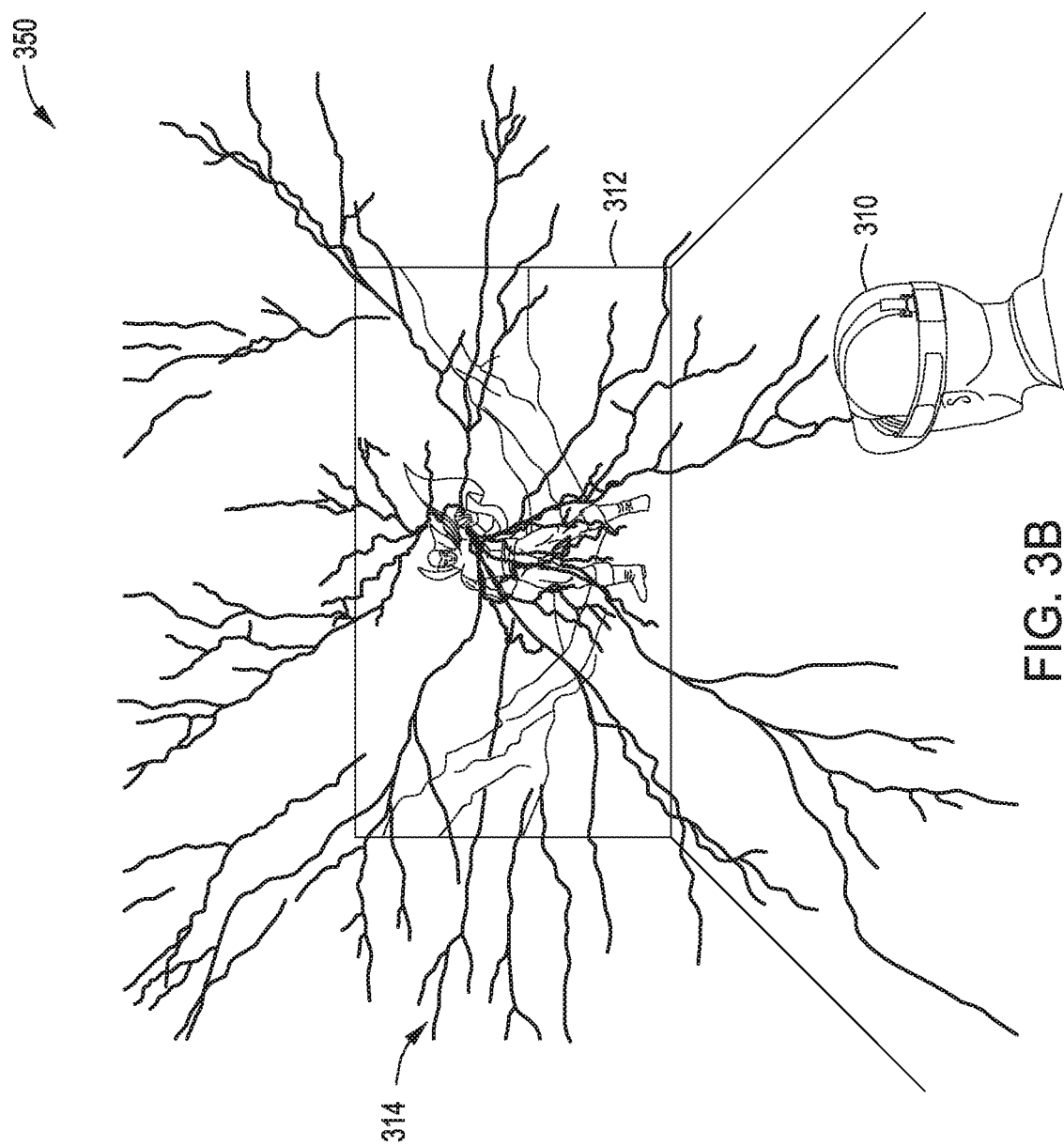

FIGS. 3A-3B illustrate examples of VR/AR environments generated by the system of FIG. 1, according to various embodiments of the present invention.

As shown in FIG. 3A, a user 310 wearing a headset views a VR/AR environment 300 that includes a virtual screen 312. The 2D media content displayed on virtual screen 312 depicts a scene where a superhero activates his power to summon lightning. Trigger generation engine 232 detects a corresponding trigger based on the point in time when the superhero summons lightning via any of the techniques described herein. In response to detecting the trigger, trigger generation engine 232 generates a 3D lightning effect 314 that appears within the VR/AR environment 350, as shown in FIG. 3B. As a result, the user 310 has the experience of being surrounded by lightning.

Figure 4:
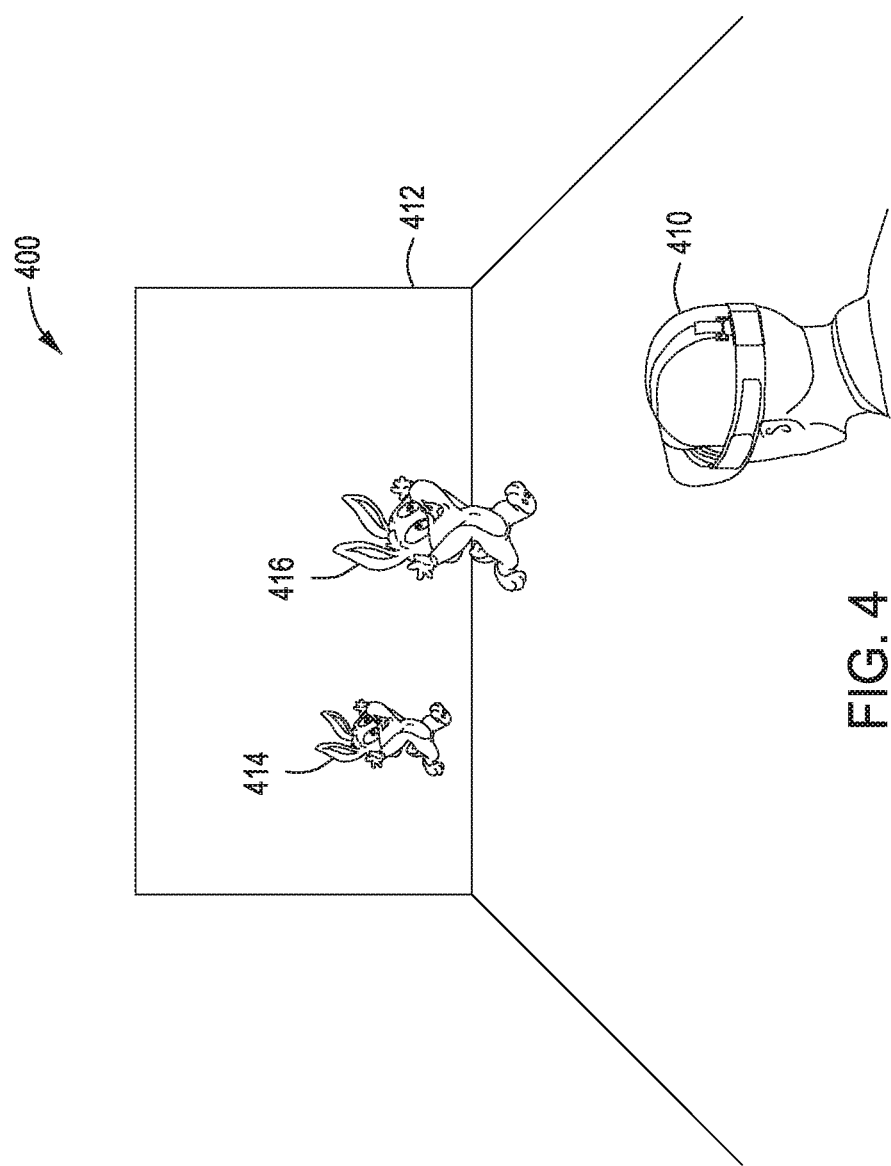
FIG. 4 illustrates another example of a VR/AR environment generated by the system of FIG. 1, according to various embodiments of the present invention.

FIG. 4 illustrates another example of a VR/AR environment generated by the system of FIG. 1, according to various embodiments of the present invention.

As shown in FIG. 4, a user 410 wearing a headset views a VR/AR environment 400 that includes a virtual screen 412. The 2D media content displayed on virtual screen 412 depicts a scene that includes a cartoon character 414, who is about to walk off screen. Trigger generation engine 232 detects a corresponding trigger based on the point in time when the cartoon character 414 walks off screen via any of the techniques described herein. In response to detecting the trigger, trigger generation engine 232 generates a 3D virtual object of the cartoon character 416 that appears in the 3D virtual or augmented environment at the point where the cartoon character 414 is no longer viewable in the 2D media content. The 3D virtual cartoon character 416 may walk into the VR/AR environment 400, look at and/or speak to the user 410, and then consequently walk back into the scene displayed in the 2D media content. The 2D media content then resumes playback.

Figure 5A:
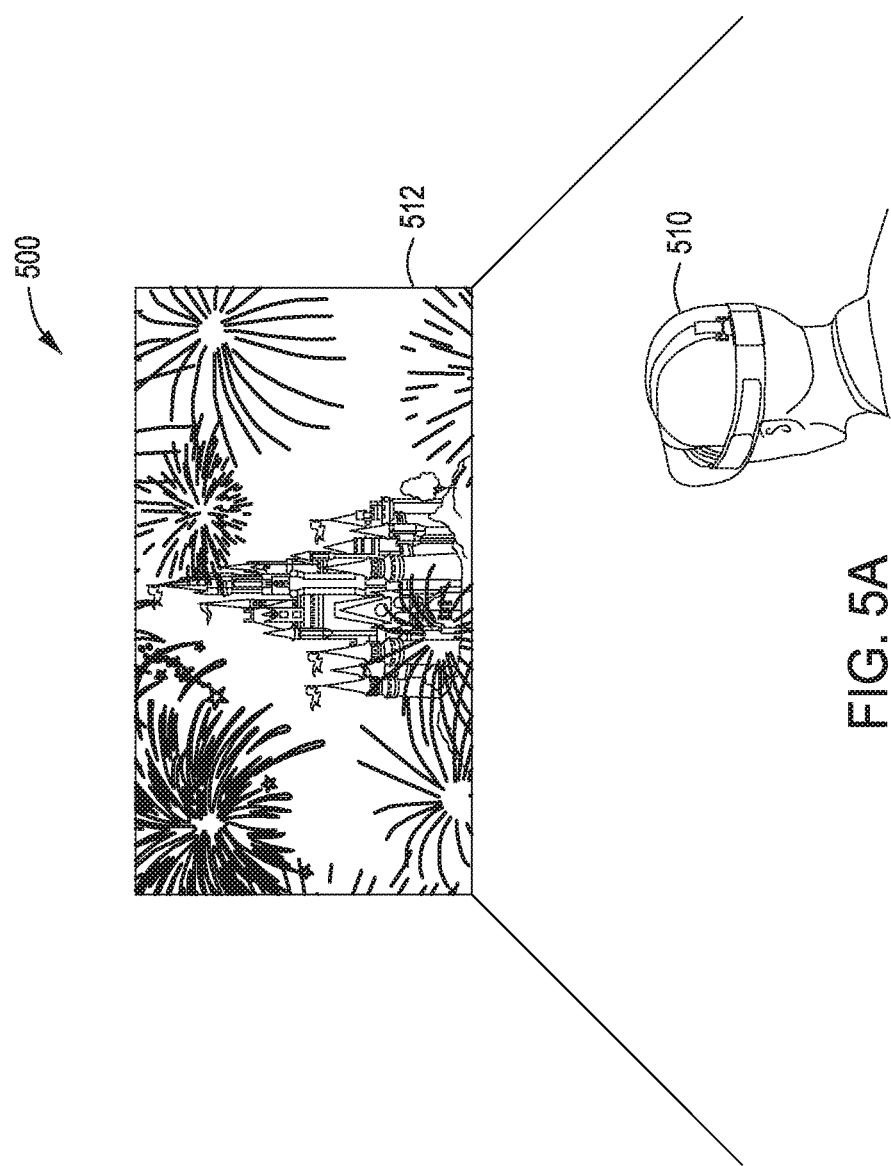
FIGS. 5A-5B illustrate other examples of VR/AR environments generated by the system of FIG. 1, according to various embodiments of the present invention.
Figure 5B:
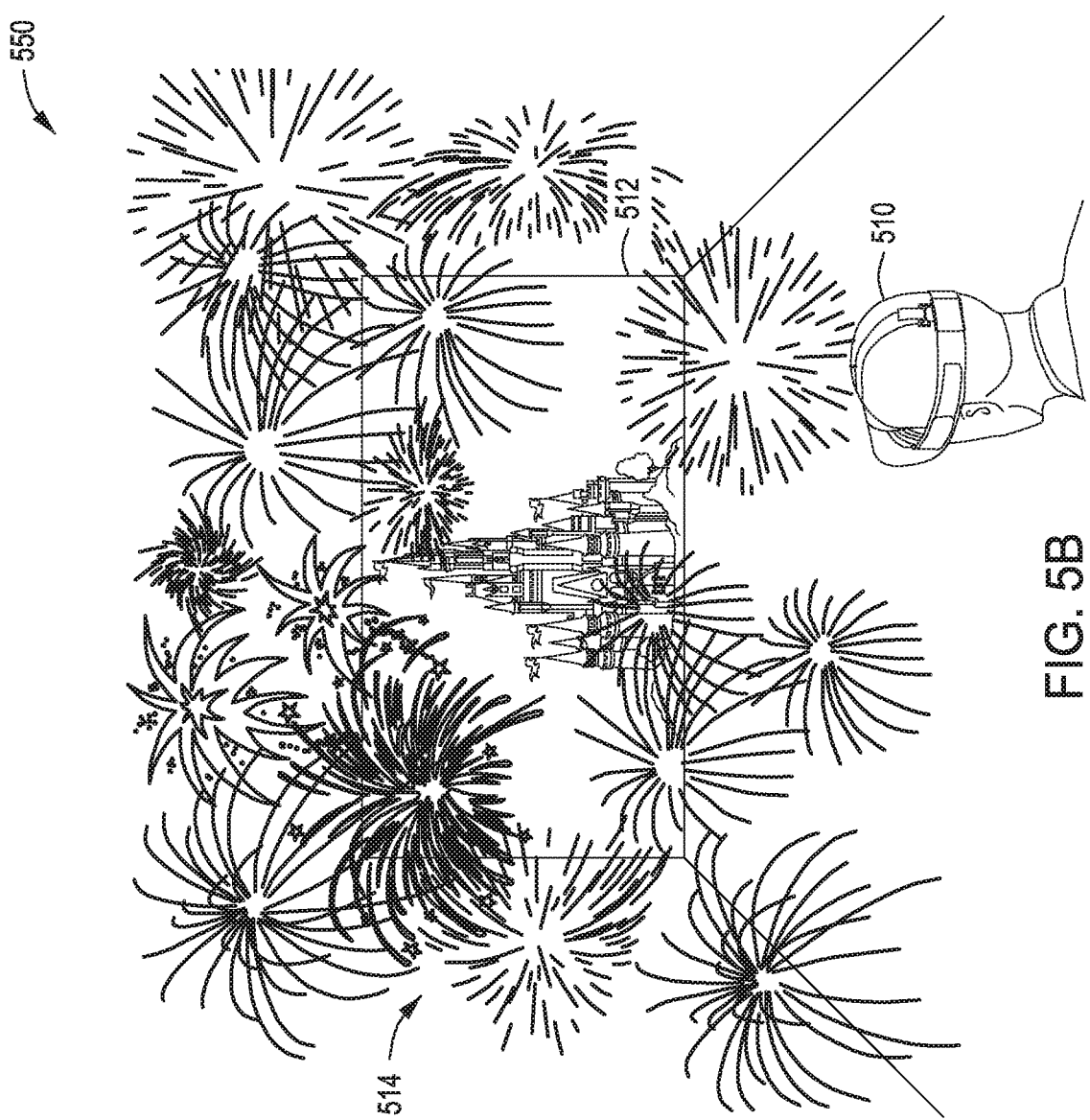

FIGS. 5A-5B illustrate other examples of VR/AR environments generated by the system of FIG. 1, according to various embodiments of the present invention.

As shown in FIG. 5A, a user 510 wearing a headset views a VR/AR environment 500 that includes a virtual screen 512. The 2D media content displayed on virtual screen 512 depicts a scene where fireworks burst above a castle. Trigger generation engine 232 detects a corresponding trigger based on the point in time when the fireworks explode via any of the techniques described herein. In response to detecting the trigger, trigger generation engine 232 generates a 3D fireworks effect 514 that appears within the VR/AR environment 550, as shown in FIG. 5B. As a result, the user 310 has the experience of being surrounded by fireworks.

Figure 6:
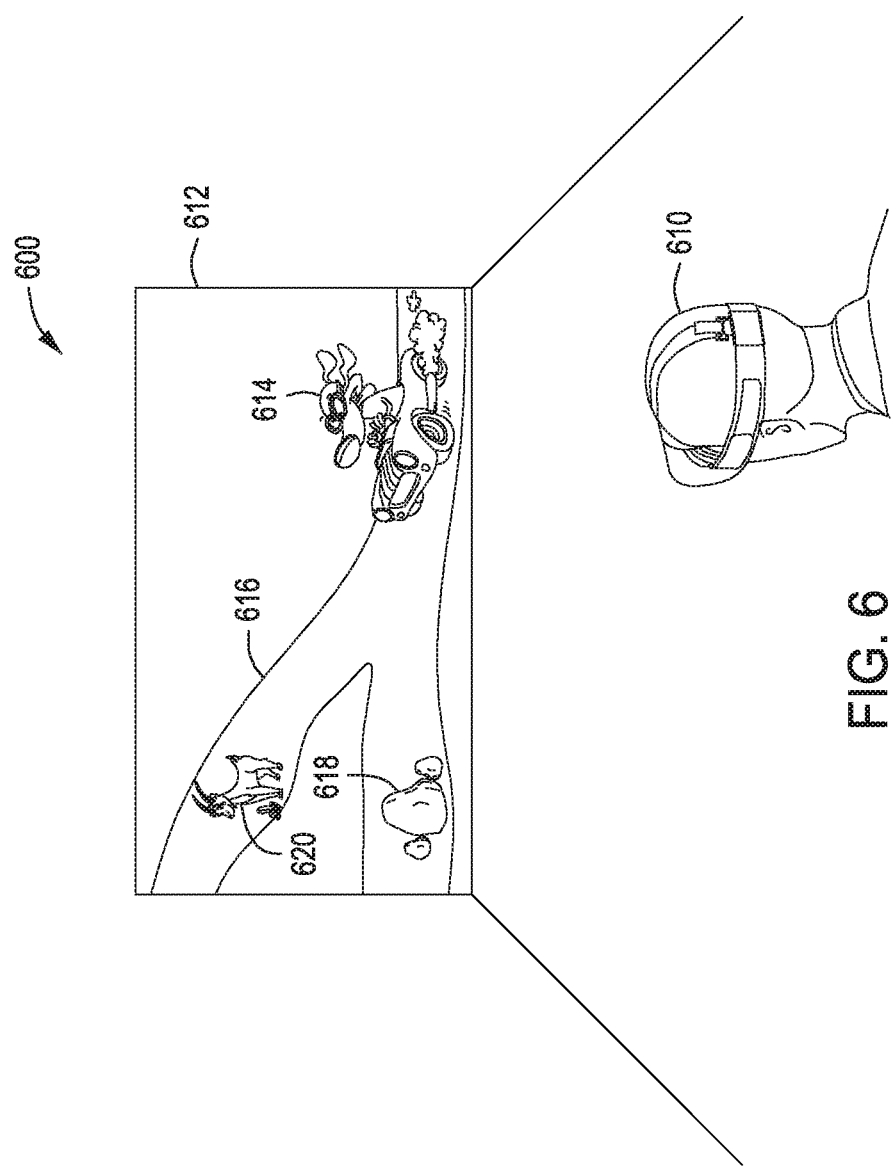
FIG. 6 illustrates yet another example of a VR/AR environment generated by the system of FIG. 1, according to various embodiments of the present invention.

FIG. 6 illustrates yet another example of a VR/AR environment generated by the system of FIG. 1, according to various embodiments of the present invention.

As shown in FIG. 6, a user 610 wearing a headset views a VR/AR environment 600 that includes a virtual screen 612. The 2D media content displayed on virtual screen 612 depicts a scene where a vehicle 614 arrives at a fork in a road 616. One fork is blocked by a stone 618, while the other fork is blocked by a goat 620. The user 610 selects a particular path on the road 616 by selecting either the stone 618 or the goat 620 via the controls on controller 108. The selection made via controller 108 generates a corresponding trigger, and controller 108 transmits the trigger to trigger generation engine 232. If the user 610 selects the stone 618, trigger generation engine 232 animates the stone 618 to roll away. 2D media content is displayed on virtual screen 612 where the vehicle 614 progresses on the corresponding path. Similarly, if the user 610 selects the goat 620, trigger generation engine 232 animates the goat 620 to walk out of the way. 2D media content is displayed on virtual screen 612 where the vehicle 614 progresses on the corresponding path.

Figure 7:
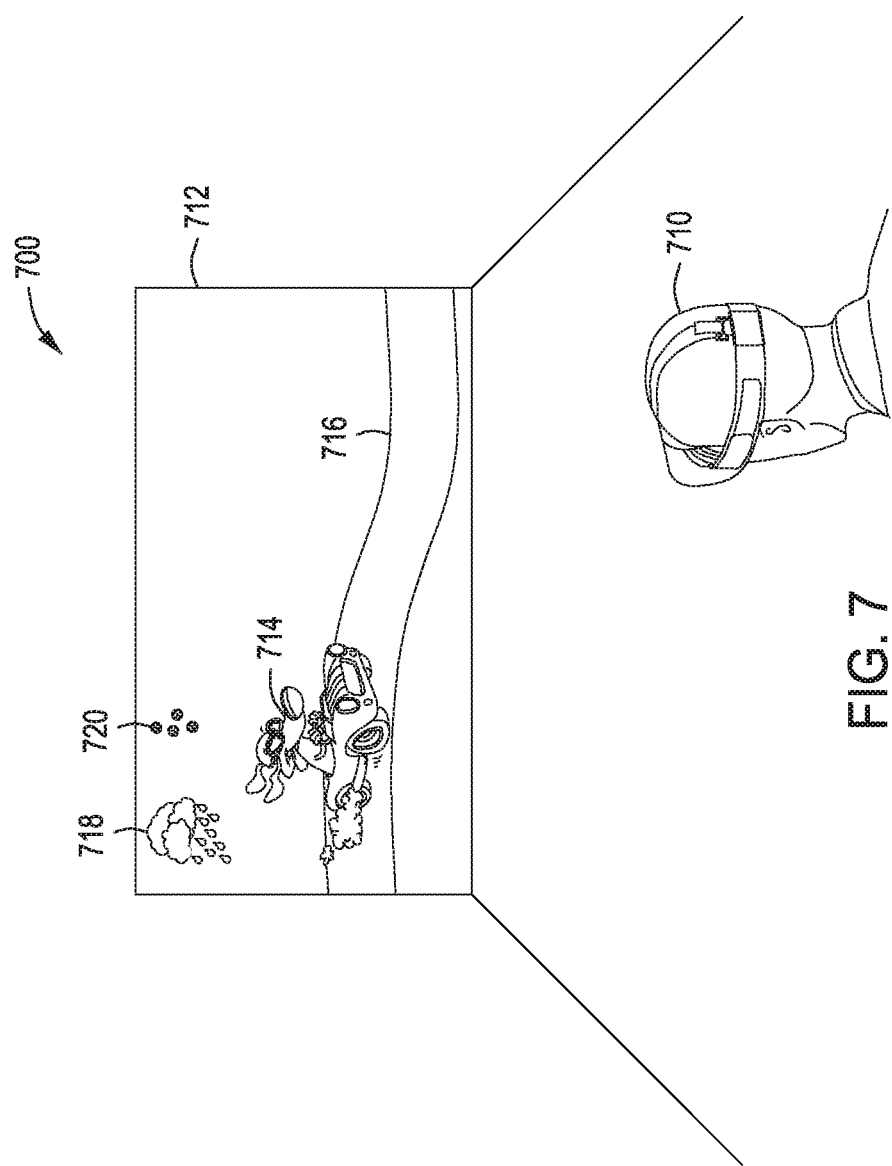
FIG. 7 illustrates a further example of a VR/AR environment generated by the system of FIG. 1, according to various embodiments of the present invention.

FIG. 7 illustrates a further example of a VR/AR environment generated by the system of FIG. 1, according to various embodiments of the present invention.

As shown in FIG. 7, a user 710 wearing a headset views a VR/AR environment 700 that includes a virtual screen 712. The 2D media content displayed on virtual screen 712 depicts a scene where a vehicle 714 travels along a road 716. During the scene, the user 710 may select whether rain or snow falls during the scene or whether the scene remains sunny. In one example, a user could employ a controller 108 in the form of a virtual gun that can spray water or snow at the virtual screen 712. In response, trigger generation engine 232 could generate rain or snow, respectively, during the scene depicted on the virtual screen. Trigger generation engine 232 generates objects representing falling rain or snow, as appropriate, within one or both of the virtual screen 712 and the VR/AR environment 700. Correspondingly, the 2D media content would be recorded as having three alternate scenes, a scene with rain, a scene that has snowfall, and a scene without rain or snow.

In addition, or alternatively, trigger generation engine 232 could generate objects representing a raincloud 718 and a snowball 720 during a range of time where the user 710 may select rain or snowfall. If the user 710 selects the raincloud 718 during this range of time, then trigger generation engine 232 generates objects representing falling rain within one or both of the virtual screen 712 and the VR/AR environment 700. Similarly, if the user 710 selects the snowball 720 during this range of time, then trigger generation engine 232 generates objects representing falling snowflakes within one or both of the virtual screen 712 and the VR/AR environment 700. If the user 710 does not select either the raincloud 718 or the snowball 720, then trigger generation engine 232 does not generate either rain or snow, and the weather remains sunny. In this manner, the 2D media content depicted on the virtual screen 712 progresses and changes according to selections made by the user 710.

Figure 8A:
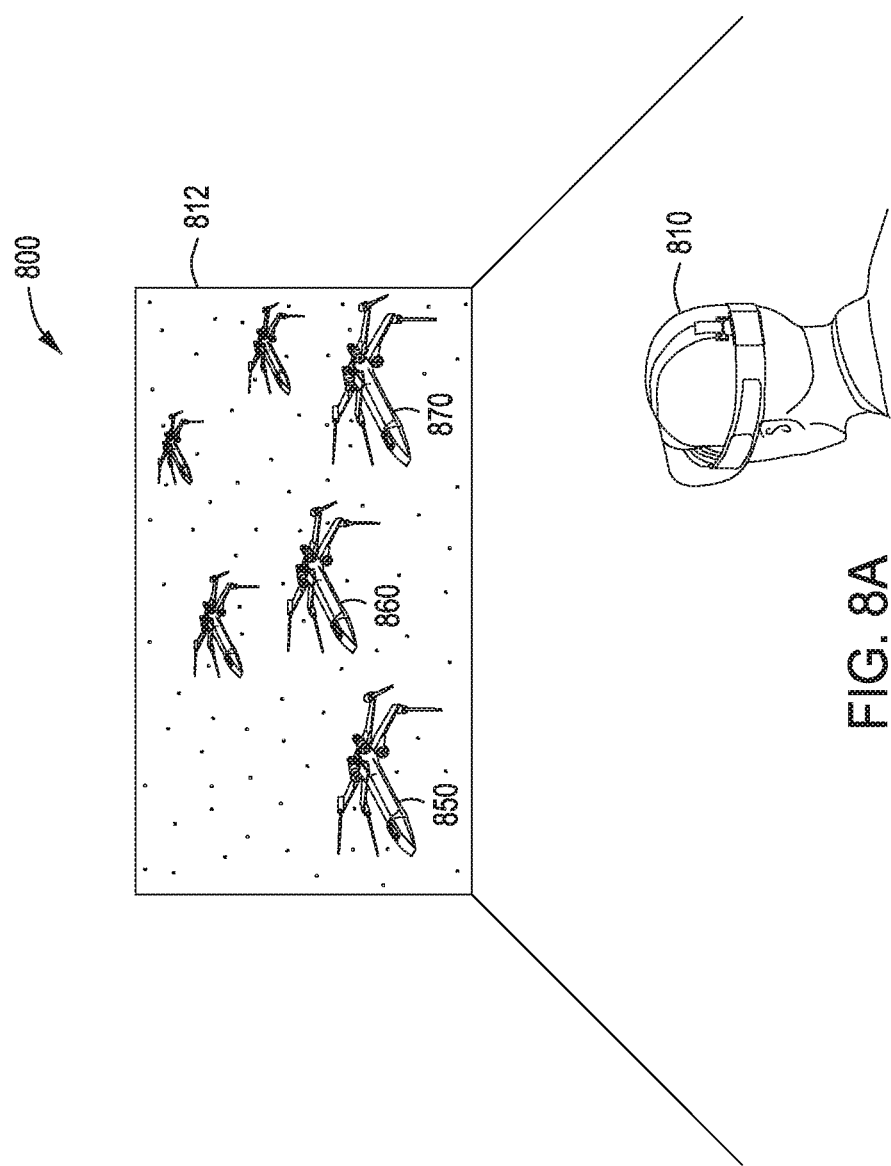
FIGS. 8A-8C illustrate various further examples of VR/AR environments generated by the system of FIG. 1, according to various embodiments of the present invention.
Figure 8B:
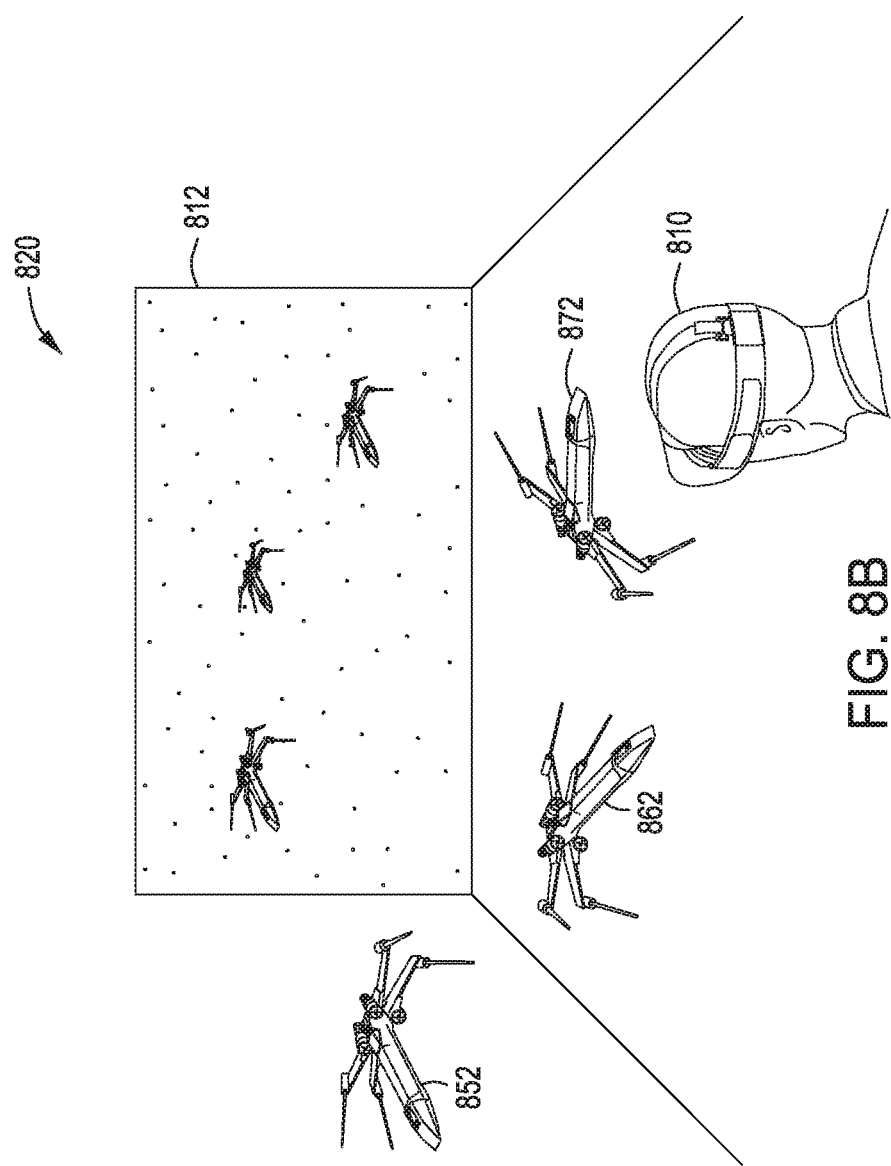
Figure 8C:
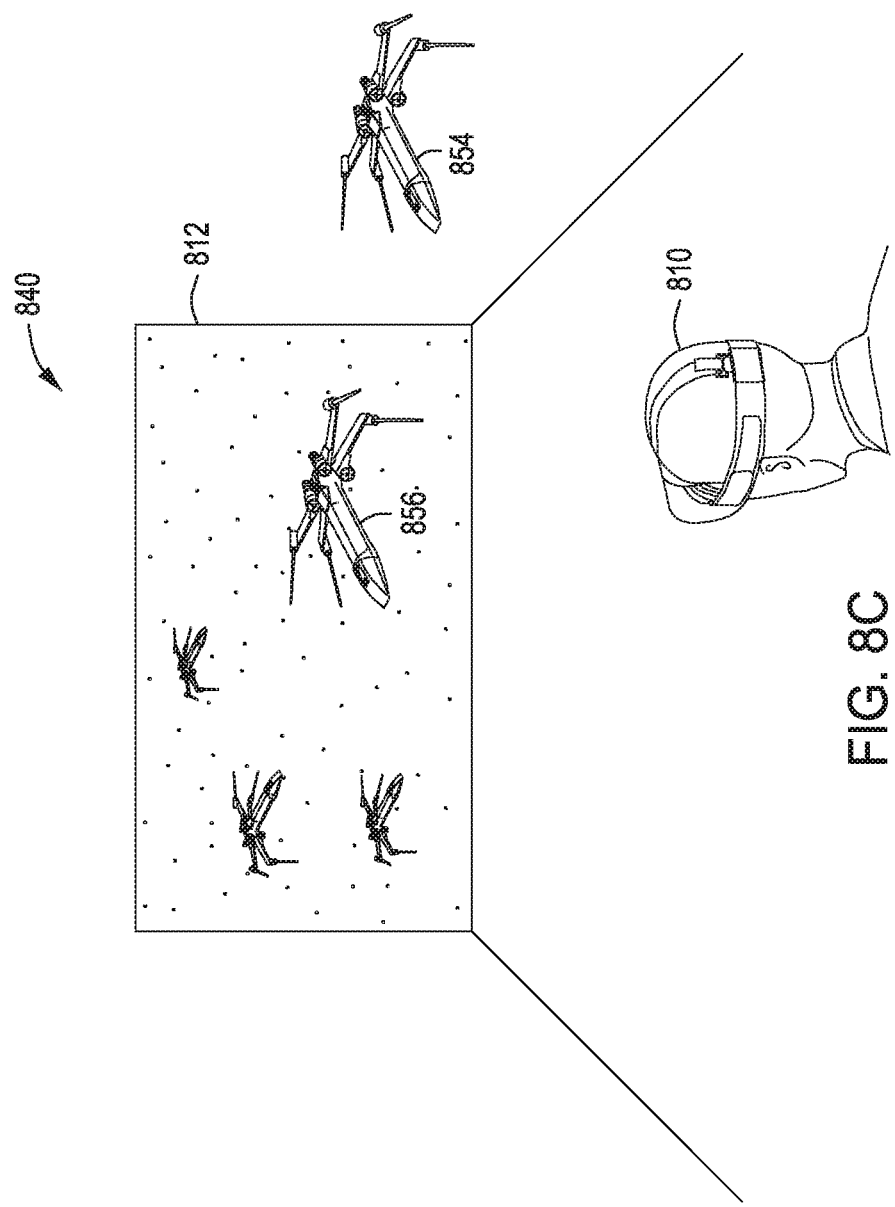

FIGS. 8A-8C illustrate various further examples of VR/AR environments generated by the system of FIG. 1, according to various embodiments of the present invention.

As shown in FIG. 8A, a user 810 wearing a headset views a VR/AR environment 800 that includes a virtual screen 812. The 2D media content displayed on virtual screen 812 depicts a scene where various spaceships are flying out of and back into the 2D media content displayed on virtual screen 812. At a particular point in time, trigger generation engine 232 detects three triggers via any of the techniques described herein, indicating that three corresponding spaceships 850, 860, and 870 are about to leave the boundary of the virtual screen 812. In response, trigger generation engine 232 generates three corresponding 3D virtual objects 852, 862, and 872, as shown in the VR/AR environment 820 illustrated in FIG. 8B. The three 3D virtual objects 852, 862, and 872 represent the three spaceships 850, 860, and 870, respectively. Each of the generated 3D virtual objects 852, 862, and 872 includes a trigger to cause the corresponding spaceship 850, 860, and 870 to be rendered on the virtual screen 812 when the respective spaceships 850, 860, and 870 reenters the boundary of the virtual screen 812.

The 3D virtual objects 852, 862, and 872 representing the spaceships fly around the VR/AR environment 820. Via controller 108, the user 810 attempts to deflect or shoot down the 3D virtual objects 852, 862, and 872 representing the spaceships. For example, the user 810 could deflect or shoot down 3D virtual objects 862 and 872 corresponding to spaceships 860 and 870, respectively. However, the user 810 may not be able to deflect or shoot down 3D virtual object 852 corresponding to spaceship 850. As a result, the triggers embedded in 3D virtual objects 862 and 872 are deleted, and the trigger embedded in 3D virtual object 852 remains.

As shown in the VR/AR environment 840 illustrated in FIG. 8C, the remaining 3D virtual object 852 has moved to a different position, illustrated as 3D virtual object 854. 3D virtual object 854 is now in a position to reenter the boundary of virtual screen 812 displaying the 2D media content and then disappear. In response, trigger generation engine 232 detects the trigger from 3D virtual object 854 and renders a corresponding 2D spaceship 856 that appears on virtual screen 812.

In this manner, a variety of effects may be generated by synchronizing 2D video triggers with 3D objects. Via the above-described techniques, combined with appropriate timing and location tracking, trigger generation engine 232 could generate any content that moves back and forth between the 2D media content displayed on virtual screen 812 and the VR/AR environment 800, 820, and 840.

Figure 9A:
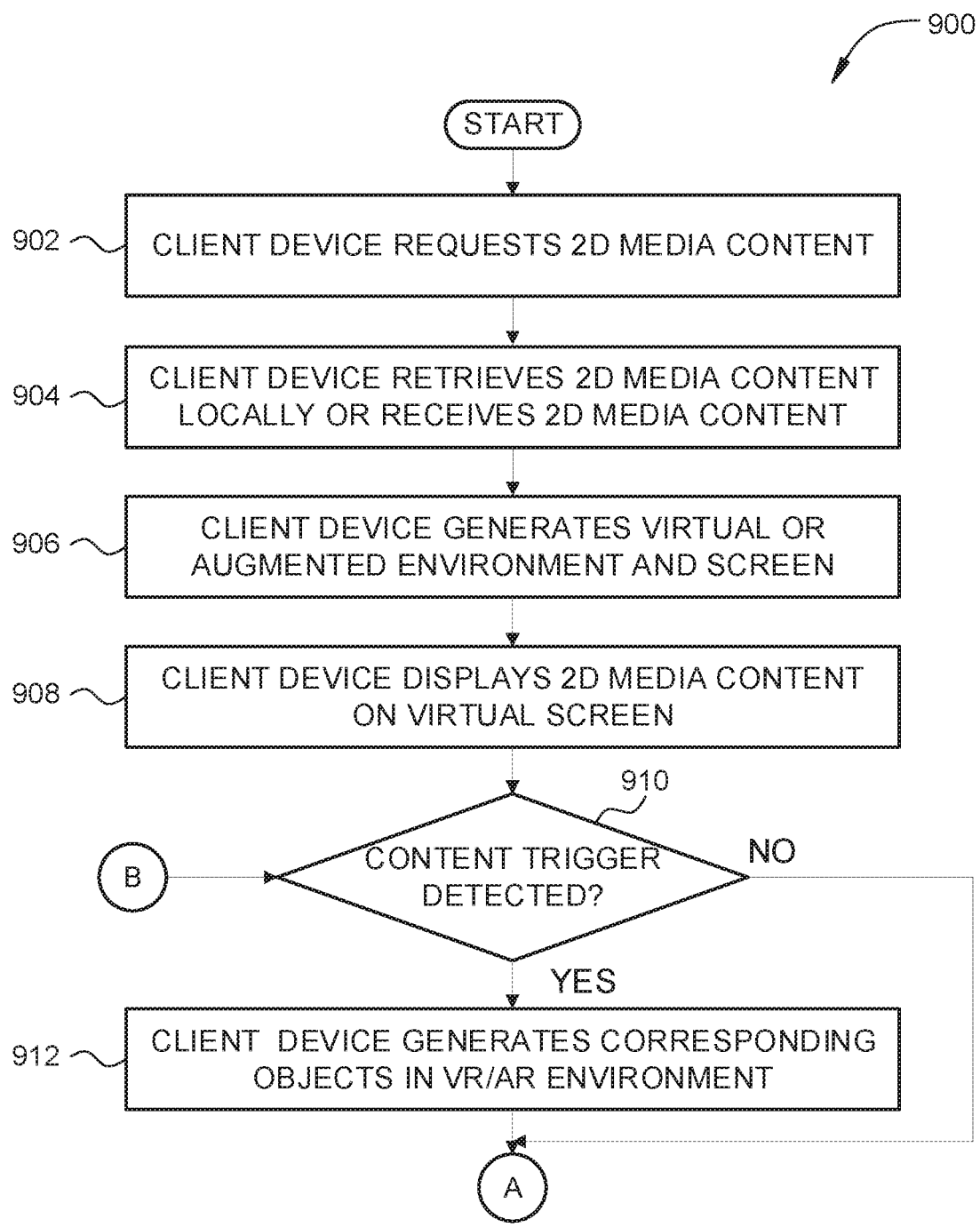
FIGS. 9A-9B set forth a flow diagram of method steps for generating a virtual object for a VR/AR environment in response to a trigger, according to various embodiments of the present invention.
Figure 9B:
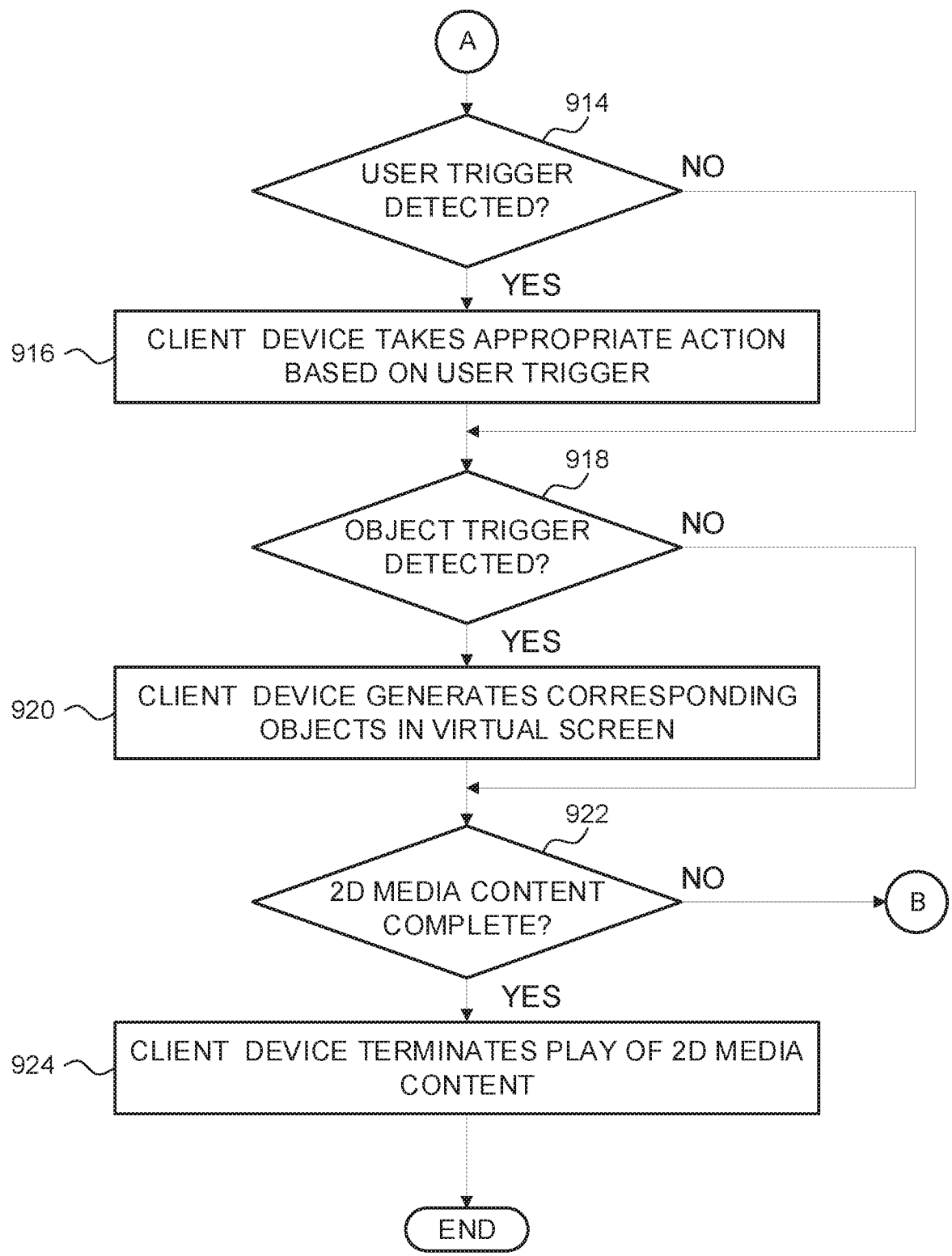

FIGS. 9A-9B set forth a flow diagram of method steps for generating a virtual object for a VR/AR environment in response to a trigger, according to various embodiments of the present invention. Although the method steps are described in conjunction with the systems of FIGS. 1-8C, persons of ordinary skill in the art will understand that any system configured to perform the method steps, in any order, is within the scope of the present invention.

As shown, a method 900 begins at step 902, where trigger generation engine 232 executing on client device 104 requests a particular item of 2D media content such as a movie, television program, or other video content. At step 904, client device retrieves the 2D media content locally or receives the 2D media content from a remote server. In some embodiments, trigger generation engine 232 retrieves the 2D media content locally, such as from storage 204 or from a media store 242 in memory 212. In some embodiments, trigger generation engine 232 transmits a request for the 2D media content to content management server 102. In response, content management server 102 transmits the 2D media content to client device 104. Trigger generation engine 232 then receives the 2D media content.

At step 906, trigger generation engine 232 generates a virtual reality or augmented reality (VR/AR) environment including a virtual screen upon which to display the 2D media content. At step 908, trigger generation engine 232 displays the 2D media content on the virtual screen.

At step 910, trigger generation engine 232 determines whether a content trigger is detected. Trigger generation engine 232 may detect a content trigger from metadata embedded in the 2D media content. In addition or alternatively, trigger generation engine 232 may detect a content trigger from a watermark embedded in a video frame of the 2D media content. In addition or alternatively, trigger generation engine 232 may receive a content trigger from ML engine 234, where ML engine 234 analyzes the 2D media content to predict when a content-based trigger should occur. If trigger generation engine 232 has not detected a content trigger, then the method proceeds to step 914, described below. If, however, trigger generation engine 232 has detected a content trigger, then the method proceeds to step 912, where trigger generation engine 232 generates one or more 2D or 3D virtual objects in the VR/AR environment. In so doing, trigger generation engine 232 retrieves the appropriate 2D or 3D virtual objects from 2D/3D object store 244. Trigger generation engine 232 renders the 2D or 3D virtual objects at a size, position, and motion path based on a unique identifier (UID) associated with the content trigger.

At step 914, trigger generation engine 232 determines whether a user trigger is detected. Trigger generation engine 232 may detect a user trigger from controller 108. A user may employ one or more controls to alter the 2D media content and/or the VR/AR environment. For example, the user could employ the controller 108 to select which path of a forked road to take. In addition or alternatively, the user could employ the controller 108 to select whether the current sunny conditions change to rain or snowfall in the current scene. In addition or alternatively, the user could employ the controller 108 to deflect or shoot down one or more virtual objects that appear in the VR/AR environment.

If trigger generation engine 232 has not detected a user trigger, then the method proceeds to step 918, described below. If, however, trigger generation engine 232 has detected a content trigger, then the method proceeds to step 916, where trigger generation engine 232 takes an appropriate action based on the user trigger. For example, trigger generation engine 232 could display different segments of the 2D media content depending on which path of a forked road that the user selects. Trigger generation engine 232 could cause rain or snow to fall in the current scene. Trigger generation engine 232 could deflect or delete a 2D or 3D virtual object, along with any embedded triggers, if the user successfully shoots the 2D or 3D virtual object via the controller 108.

At step 918, trigger generation engine 232 determines whether an object trigger is detected. Trigger generation engine 232 may detect an object trigger from an object that is about to intersect with the boundary of a virtual screen in the VR/AR environment. If trigger generation engine 232 has not detected a content trigger, then the method proceeds to step 920, described below. If, however, trigger generation engine 232 has detected an object trigger, then the method proceeds to step 920, where trigger generation engine 232 generates one or more 2D or 3D virtual objects in the VR/AR environment. For example, trigger generation engine 232 could generate a 2D object corresponding to the object associated with the trigger and overlay the 2D object onto the 2D media content displayed in the virtual screen. Trigger generation engine 232 renders the 2D or 3D virtual objects at a size, position, and motion path based on a unique identifier (UID) associated with the object trigger.

At step 922, trigger generation engine 232 determines whether playback of the 2D media content is complete. If playback of the 2D media content is not complete, then the method proceeds to step 910, described above. If playback of the 2D media content is complete, then the method proceeds to step 924, where trigger generation engine 232 terminates play of the 2D media content. Trigger generation engine 232 may then take other appropriate actions, including, without limitation, fading the 3D virtual environment to black, and displaying a default visual effect. The method 900 then terminates.

In sum, techniques are disclosed for generating an immersive and interactive 3D virtual or augmented environment that includes 2D media content, such as movies, television programs, and other video content. When viewing such 2D media content through a VR/AR headset, a VR/AR application detects triggers and, in response, generates and displays associated 3D objects. As a result, 2D media content is presented as if the content was originally created for a 3D VR/AR environment.

The 3D objects are generated in response to detecting triggers via various techniques. In a first technique, triggers are embedded into metadata within the 2D media content itself. The trigger includes a unique identifier (UID) and a timestamp. The UID identifies which objects and effects to instantiate. Via the UID, the VR/AR application determines the location of a description file of the object or effect, along with position, size, orientation, duration of existence, motion characteristics, and any other relevant information needed to generate and animate the 3D object or effect. When the playback of the 2D media content reaches the time indicated by the timestamp, the VR/AR application generates the 3D object based on the characteristics identified by the UID.

In a second technique, the trigger is embedded into a watermark that is present in a video frame of the 2D media content. The watermark includes an encoding of the UID. The watermark may further include a timestamp that identifies the time of the trigger. In addition or alternatively, the time of the trigger may be the time of the video frame where the watermark appears. At the appropriate time, the VR/AR application generates the 3D object based on the characteristics identified by the UID.

In a third technique, a machine learning (ML) engine analyzes the 2D media content to determine when a trigger takes place. For example, the ML engine could detect when a particular object in the 2D media content is about to leave the space bounded by the virtual screen. The ML engine would then generate a trigger at the appropriate time. The trigger would identify a model of the 3D object, along with position, size, orientation, and motion characteristics of the 3D object. The VR/AR application would generate the 3D object based on the characteristics determined by the ML engine.

Further, one or more of the generated 3D objects may include an embedded trigger. The embedded trigger includes a UID that defines an event that occurs when the corresponding 3D object interacts with the virtual screen. For example, a first trigger could cause the VR/AR application to generate a 3D object with a second embedded trigger. The VR/AR application generates the 3D object when a corresponding element in the 2D media content is about to leave the boundary of the virtual screen. The 3D object would then move through the VR/AR environment and could consequently approach the virtual screen. As the 3D object is about the reenter the boundary of the virtual screen, the second embedded trigger would cause the VR/AR application to generate a corresponding 2D element within the 2D media content.

At least one advantage of the disclosed techniques is that 2D media content, when viewed via a VR/AR headset, is more interactive relative to prior approaches. More particularly, by triggering the generation of appropriate 2D and 3D objects in the VR/AR environment and providing mechanisms to interact with these 2D and 3D objects, the user's experience is more immersive and unique relative to prior approaches. In this manner, a variety of effects may be generated by synchronizing 2D video triggers with 2D and 3D objects. Further, triggers may be embedded within the generated 2D and 3D objects. Consequently, an event trigger in a 2D video sequence may produce a 3D object in the VR/AR environment, and the 3D object may consequently trigger an event in the 2D media content. As a result, the user has the experience of being inside the 2D media content rather than just viewing the content from an "outsider's" perspective. These advantages represent one or more technological improvements over the prior art.

1. In some embodiments, a computer-implemented method for generating a virtual object in response to a trigger includes receiving a first media content item, detecting an event trigger associated with the first media content item; generating at least a portion of a first virtual object based on the event trigger, and displaying the first media content item and the at least a portion of the first virtual object on a display associated with a user device.

2. The computer-implemented method according to clause 1, wherein the event trigger is embedded as metadata within a file associated with the first media content item.

3. The computer-implemented method according to clause 1 or clause 2, wherein the event trigger is encoded into a video frame included in the first media content item.

4. The computer-implemented method according to any of clauses 1-3, further comprising predicting a first time when an object included in the first media content item is to intersect a virtual screen on which the first media content item is displayed, and generating the event trigger based on the first time.

5. The computer-implemented method according to any of clauses 1-4, wherein the event trigger includes a unique identifier (UID) that identifies a first characteristic associated with the at least a portion of the first virtual object.

6. The computer-implemented method according to any of clauses 1-5, wherein the first characteristic determines, at least in part, how the at least a portion of the first virtual object is displayed.

7. The computer-implemented method according to any of clauses 1-6, wherein the event trigger includes a timestamp that identifies a first time at which the at least a portion of the first virtual object is displayed.

8. The computer-implemented method according to any of clauses 1-7, further comprising receiving a selection of the first virtual object via a controller associated with the user device, generating at least a portion of a second virtual object based on the selection, and displaying the at least a portion of the second virtual object on the display.

9. The computer-implemented method according to any of clauses 1-8, further comprising receiving a selection of the first virtual object via a controller associated with the user device, and displaying a second media content item on the display.

10. A non-transitory computer-readable medium including instructions that, when executed by a processor, cause the processor to generate a first virtual object in response to a trigger, by performing the steps of receiving a media content item, detecting a first event trigger associated with the media content item, generating at least a portion of the first virtual object based on the first event trigger, and displaying the media content item and the at least a portion of the first virtual object on a display associated with a user device.

11. The non-transitory computer-readable medium according to clause 10, wherein the first event trigger is embedded as metadata within a file associated with the media content item.

12. The non-transitory computer-readable medium according to clause 10 or clause 11, wherein the first event trigger is encoded into a video frame included in the media content item.

13. The non-transitory computer-readable medium according to any of clauses 10-12, wherein the first event trigger includes a unique identifier (UID) that identifies a first characteristic associated with the at least a portion of the first virtual object.

14. The non-transitory computer-readable medium according to any of clauses 10-13, wherein the first characteristic determines, at least in part, how the at least a portion of the first virtual object is displayed.

15. The non-transitory computer-readable medium according to any of clauses 10-14, wherein the first event trigger includes a timestamp that identifies a first time at which the at least a portion of the first virtual object is displayed.

16. The non-transitory computer-readable medium according to any of clauses 10-15, further comprising embedding a second event trigger as metadata within a file associated with the at least a portion of the first virtual object.

17. The non-transitory computer-readable medium according to any of clauses 10-16, further comprising determining that the at least a portion of the first virtual object is to be removed from the display, and deleting the second event trigger.

18. The non-transitory computer-readable medium according to any of clauses 10-17, further comprising determining that the at least a portion of the first virtual object is to intersect a virtual screen upon which the media content item is displayed, generating at least a portion of a second virtual object based on the second event trigger; and displaying the at least a portion of the second virtual object on the display.

19. A computing device, comprising a memory that includes a trigger generation engine; and a processor that is coupled to the memory and, when executing the trigger generation engine, is configured to receive a media content item, detect an event trigger associated with the media content item, generate at least a portion of a virtual object based on the event trigger, and display the media content item and the at least a portion of the virtual object on a display associated with a user device.

20. The computing device according to clause 19, wherein the memory further includes a machine learning engine, and wherein the processor, when executing the machine learning engine, is configured to predict a first time when an object included in the media content item is to intersect a virtual screen upon which the media content item is displayed, and generate the event trigger based on the first time.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a virtual object in response to a trigger, the method comprising:
   receiving a first media content item;
   detecting a first event trigger associated with the first media content item, wherein the first event trigger is activated when a first virtual representation of a first object based on a first number of dimensions crosses a display boundary associated with a virtual two-dimensional screen that is included within a virtual environment, and wherein the virtual two-dimensional screen displays the first media content item within the virtual environment;
   generating at least a portion of a second virtual representation of the first object and a second event trigger based on a second number of dimensions that is different than the first number of dimensions, wherein the second event trigger is included in the second virtual representation of the first object; and
   displaying the first media content item and, based on the display boundary, the at least a portion of the second virtual representation of the first object on one or more displays associated with a user device.

2. The computer-implemented method of claim 1, wherein the first event trigger is embedded as metadata within a file associated with the first media content item.

3. The computer-implemented method of claim 1, wherein the first event trigger is encoded into a video frame included in the first media content item.

4. The computer-implemented method of claim 1, further comprising:
   predicting a first time when an object included in the first media content item is to intersect a screen on which the first media content item is displayed; and
   generating the first event trigger based on the first time.

5. The computer-implemented method of claim 1, wherein the first event trigger includes a unique identifier (UID) that identifies a first characteristic associated with the first object.

6. The computer-implemented method of claim 5, wherein the first characteristic determines, at least in part, how the at least a portion of the second virtual representation of the first object is displayed.

7. The computer-implemented method of claim 1, wherein the first event trigger includes a timestamp that identifies a first time at which the at least a portion of the second virtual representation of the first object is displayed.

8. The computer-implemented method of claim 1, further comprising:
   receiving a selection of the first object via a controller associated with the user device;
   generating at least a portion of a virtual representation of a second object based on the selection; and
   displaying the at least a portion of the virtual representation of the second object on the display.

9. The computer-implemented method of claim 1, further comprising:
   receiving a selection of the first object via a controller associated with the user device; and
   displaying a second media content item on the display.

10. The computer-implemented method of claim 1, wherein the second virtual representation of the first object is displayed on the one or more displays while the first virtual representation of the first object remains outside of the display boundary.

11. A non-transitory computer-readable medium including instructions that, when executed by a processor, cause the processor to generate a virtual representation of an object in response to a trigger, by performing the steps of:

receiving a first media content item;

detecting a first event trigger associated with the first media content item, wherein the first event trigger is activated when a first virtual representation of a first object based on a first number of dimensions crosses a display boundary associated a virtual two-dimensional screen that is included within a virtual environment, and wherein the virtual two-dimensional screen displays the first media content item within the virtual environment;

generating at least a portion of a second virtual representation of the first object and a second event trigger based on a second number of dimensions that is different that the first number of dimensions, wherein the second event trigger is included in the second virtual representation of first object; and displaying the first media content item and, based on the display boundary, the at least a portion of the second virtual representation of the first object on one or more displays associated with a user device.

12. The non-transitory computer-readable medium of claim 11, wherein the first event trigger is embedded as metadata within a file associated with the media content item.

13. The non-transitory computer-readable medium of claim 11, wherein the first event trigger is encoded into a video frame included in the media content item.

14. The non-transitory computer-readable medium of claim 11, wherein the first event trigger includes a unique identifier (UID) that identifies a first characteristic associated with the first object.

15. The non-transitory computer-readable medium of claim 14, wherein the first characteristic determines, at least in part, how the at least a portion of the second virtual representation of the first object is displayed.

16. The non-transitory computer-readable medium of claim 11, wherein the first event trigger includes a timestamp that identifies a first time at which the at least a portion of the second virtual representation of the first object is displayed.

17. The non-transitory computer-readable medium of claim 11, further comprising embedding the second event trigger as metadata within a file associated with the at least a portion of the second virtual representation of the first object.

18. The non-transitory computer-readable medium of claim 11, further comprising:

determining that the at least a portion of the second virtual representation of the first object is to be removed from the one or more displays; and deleting the second event trigger.

19. The non-transitory computer-readable medium of claim 11, further comprising:

determining that the at least a portion of the second virtual representation of the first object is to intersect a virtual screen upon which the media content item is displayed;

generating at least a portion of a virtual representation of a second object based on the second event trigger; and displaying the at least a portion of the virtual representation of the second object on the display.

20. A computing device, comprising:

a memory that includes a trigger generation engine; and a processor that is coupled to the memory and, when executing the trigger generation engine, is configured to:

receive a first media content item;

detect a first event trigger associated with the first media content item, wherein the first event trigger is activated when a first virtual representation of a first object based on a first number of dimensions crosses a display boundary associated with a virtual two-dimensional screen that is included within a virtual environment, and wherein the virtual two-dimensional screen displays the first media content item within virtual environment;

generate at least a portion of a second virtual representation of the first object and a second event trigger based on a second number of dimensions that is different than the first number of dimensions, wherein the second event trigger is included in the second virtual representation of the first object; and display the first media content item and, based on the display boundary, the at least a portion of the second virtual representation of the first object on one or more displays associated with a user device.

21. The computing device of claim 20, wherein the memory further includes a machine learning engine, and wherein the processor, when executing the machine learning engine, is configured to:

predict a first time when an object included in the first media content item is to intersect a virtual screen upon which the first media content item is displayed; and generate the first event trigger based on the first time.

* * * * *